Patented June 20, 1939

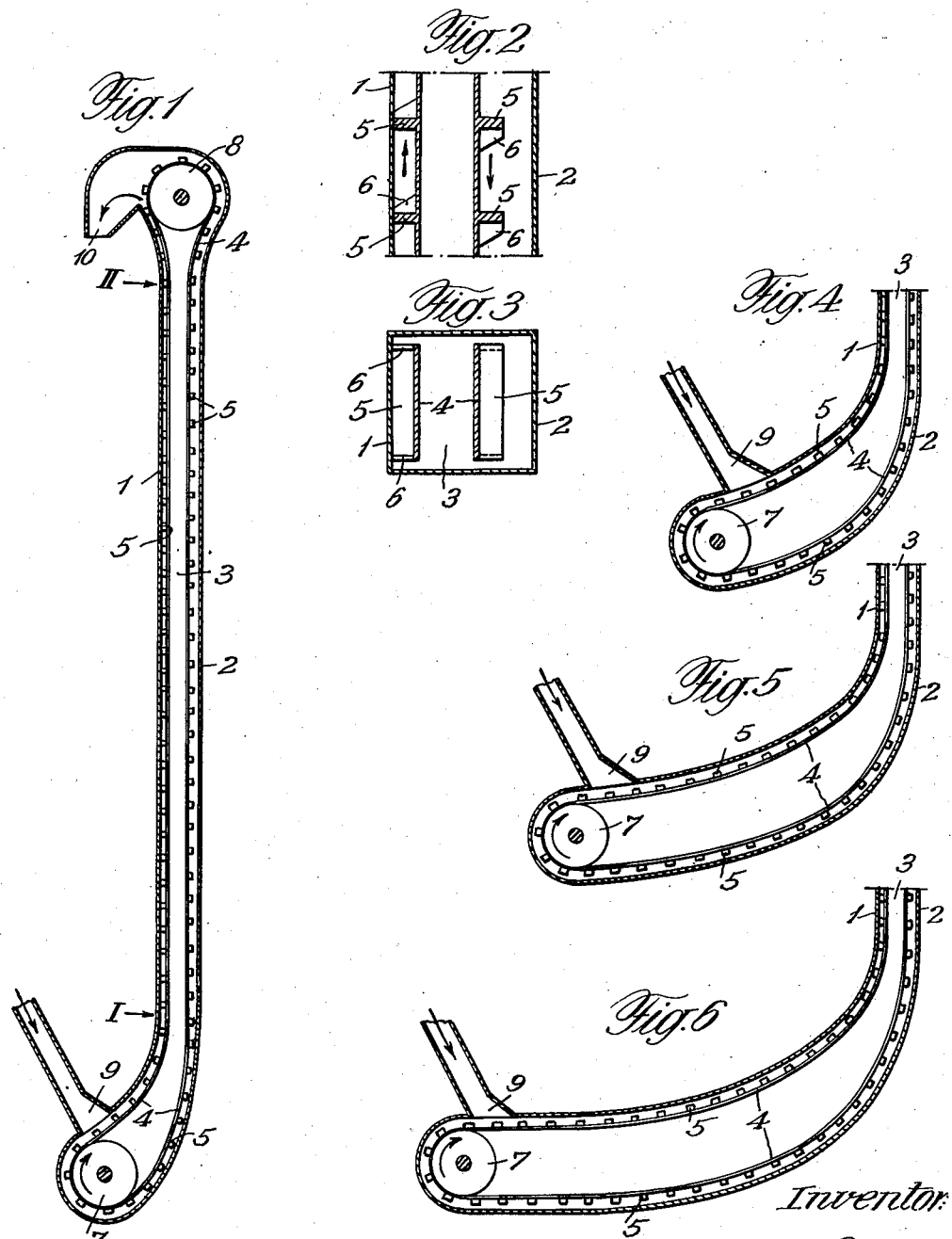

2,163,353

UNITED STATES PATENT OFFICE 2,163,353

ELEVATOR OF THE ENDLESS BAND TYPE

Ernst Roth, Uzwil, Switzerland, assignor to the firm Gebrüder Buhler, Uzwil, Switzerland Application July 8, 1938, Serial No. 218,180
In Germany July 29, 1937

1 Claim. (Cl. 198—168)

This invention has reference to conveyors or elevators provided with an endless conveyor band and preferably used for vertical transport.

The elevator, according to the invention, is provided with an endless conveyor band having cross-bars and is characterised in that the ascending run of the conveyor band at the discharge end is led towards the discharge orifice at a slope to the vertical, in order to form an easy discharge of the material conveyed at a high band-velocity.

This renders possible a simpler construction of the elevator and corresponding lowering of cost of erection and an extended life of the conveyor and a high degree of security in the working.

The drawing illustrates in a diagrammatic manner one form of construction by way of example made in accordance with the present invention wherein:

Fig. 1 is an elevation in section.

Fig. 2 is a vertical cross-section to a larger scale.

Fig. 3 is a horizontal section across Fig. 2.

Figs. 4–6 show modifications of the lower part of the elevator.

1 and 2 designate opposite sides of a shaft 3 of quadrangular cross-section.

The endless conveyor band 4 is of a flexible material (for example balata) and works in conjunction with the wall 1 of this shaft. The conveyor band 4, furthermore, is provided with transverse members or bars 5 disposed at equal distances from each other. The transverse bars 5 are provided at their ends with lateral walls 6. Transverse bars 5 of the run of the conveyor band 4 cooperating with a shaft wall are under the circumstances lightly pressed against the said wall 1, with the exception of the lower end part of the ascending run of the conveyor band. By means of its transverse bars 5 the conveyor band 4 forms with the shaft wall 1, along a vertical stretch thereof, a kind of conveyor chamber for the material to be conveyed; the ends of this vertical stretch are indicated by the arrows I, II. The return run of the conveyor band 4 also lies in the shaft 3, which at each end is provided with a guide-pulley 7 or 8 for the conveyor band 4. One of these pulleys 7 or 8 serves at the same time as a driving pulley for the conveyor band. Both the guide-pulleys 7, 8 are larger in diameter than the relevant clear width of the vertical run of the shaft 3 and are themselves disposed in widened portions, which portions of the shaft are provided with the inlet 9 attached to the wall 1 and the outlet 10 for the material to be conveyed. At the discharge end the ascending run of the elevator band is led towards the outlet orifice 10 at a slope to the vertical in order to provide an easy discharge of the material to be conveyed at high velocities of the band.

The channel-like inlet 9, with relevance to the vertical ascending stretch provided for the band 4, extends laterally from its plane, which facilitates the supply of the material to be conveyed with the object of filling the conveyor chambers. In addition also a certain amount of intervening space is expedient, which is contained in the extension to the inlet 9 between the shaft wall 1 and the transverse bars 5 of the conveyor band 4. According to the given proportion the inlet for the material to be conveyed may be disposed further away laterally relative to the vertical stretch of the ascending run of the conveyor band, as for example as indicated in the Figs. 4–6, and in which also a horizontal or practically horizontal ascending stretch for the conveyor band is formed, which gradually merges into the vertical stretch.

The provision of giving the guide-pulleys a diameter larger than the intermediate clear width of the vertical stretch of the shaft 3 makes it possible to arrange the outlet on the same side as the inlet on the side of the active run of the conveyor band. This arrangement not only results in facilitating the attendance of the conveyor, but also in a saving of clear height of the conveying device commensurate with the maximum height to which the charge has to be carried by the individual flights due to the fact that the necessity for the lifts to pass over the top guide-pulley in loaded condition is done away with. From this also arises the important advantage that a higher velocity can be obtained in operation in contradistinction to the velocity usual with conveyors provided with buckets in which, as a result of guidance thereof around the upper guide-roller there is a danger of the buckets not emptying properly under the influence of centrifugal force. The discharge of the material conveyed takes place essentially in a direction tangential to the guide-pulley 8 through the correspondingly formed outlet 10, which as a result of the sloping run of the conveyor band is very favorable for the place of discharge.

I claim:

An elevator of the type described, comprising an endless conveyor band running at high velocities, cross-bars disposed on that band, a lower and an upper guide pulley for said endless band, a channel inclosing said endless band and having a vertical portion, the cross-members of the ascending run of the endless band cooperating with the adjacent wall of the vertical portion of the channel and being lightly pressed against said wall, an inlet portion of said channel, and an outlet portion of said channel, more space being provided between the channel wall and the conveyor band in the inlet portion than in the vertical portion.

ERNST ROTH.